3,281,318
WOOD TREATMENT COMPOSITION AND
METHOD OF FORMULATING SAME
Robert E. Stutz, Memphis, Tenn., assignor to Chapman Chemical Company, Memphis, Tenn., a corporation of Tennessee
No Drawing. Filed Sept. 6, 1962, Ser. No. 221,906
14 Claims. (Cl. 167—38.7)

The instant invention relates to a wood treatment composition, and method of making the same, and more particularly, to a unique method of compounding a toxic wax-in-water emulsion, which is particularly useful as a toxic water-repellent when applied to dry lumber.

Wax emulsions have been known and used for a number of years and for various purposes. It is recognized, however, that there are a number of problems involved in the stabilization of wax emulsions so as to make the same marketable, and these problems are peculiar to the particular composition (and the specific ingredients) involved.

The treatment of wood with pentachlorophenol and/or its salts is also known in the art, although it is understood that such polychlorophenols or phenates are incompatible with many materials and generally difficult to handle, particularly in the form of concentrates in marketable condition for distribution to the end user who may dilute the same prior to use. The instant invention, however, provides a unique wax emulsion formulation for a concentrate containing a substantial quantity of polychlorophenol or polychlorophenate.

It is, therefore, an important object of the instant invention to provide an improved wax-in-water emulsion containing polychlorophenol in modified form.

It is another object of the instant invention to provide a substantially stable toxic wax-in-water emulsion formed of ingredients which include a substantial quantity of polychlorophenol.

Other and further objects, advantages and aspects of the instant invention will be apparent from the detailed description thereof which is contained herein.

One aspect of the instant invention comprises a substantially stable toxic wax-in-water emulsion formed of ingredients consisting essentially of 25% to 75% wax, 0.5% to 10% $C_{12}$–$C_{20}$ fatty acid, 0.1% to 10% polychlorophenol, 0.5% to 10% $C_2$–$C_3$ alkylol amine, and the remainder substantially water, in an amount sufficient to maintain the stable emulsion. Other aspects of the instant invention comprise methods of making the foregoing emulsion, and methods of using the same.

The instant concentrated emulsion is preferably a high wax emulsion, which may contain a minimum practical amount of about 25% to a maximum practical amount of about 75%, but the preferred amount is 50% to 70% of the total weight of the concentrate emulsion formulation. (As used herein, the term "part" means part by weight, and the term "percent" means percent by weight based on the total weight of the emulsion concentrate herein referred to often as merely the "emulsion," and this is true throughout this specification unless the percent is otherwise designated.)

In general, all waxes possess the same characteristic physical properties of feel, consistency, melting point, and water-insolubility or repellancy, and such waxes may be used in the practice of the instant invention. Such waxes include animal wax (e.g. spermaceti and wool fat waxes), insect wax (e.g. beeswax), mineral wax (e.g. ceresine, ozokerite, and montan semimineral wax), vegetable wax (e.g. carnauba wax); but the commercially available petroleum waxes are ordinarily preferred for use in the invention. The petroleum waxes constitute about 90% of all the wax used in industry today and these waxes comprise the crystalline and the microcrystalline types. The crystalline type is often referred to merely as paraffin wax which in refined form has a melting point range of 120–150° F., whereas the microcrystalline waxes have melting points within the range of 150° to 175° F. Certain process steps employed in the method of the invention will involve the heating or melting of waxes at an elevated temperature, and it will be appreciated that this elevated temperature will be at least sufficient to melt such waxes, and is generally about 180° F.

One wax which has been found to be particularly useful in the practice of the instant invention is a microcrystalline wax containing about 5% (of the total weight of the wax) of oil which is sold commercially under the trademark "Shellmax 800," and this wax will be referred to as wax S hereinafter. Another wax found to be particularly suitable in the practice of the instant invention is a low melting point paraffinic wax containing 20% oil sold by Kerr McGee under the name Kerr McGee slack wax, which will hereinafter be referred to as wax K.

Another ingredient which has been found to be particularly useful in combination with the wax for the formation of a stable emulsion is a $C_{12}$–$C_{20}$ fatty acid that is compatible with the wax and may be melted together therewith at approximately the melting temperature of the wax, or not substantially thereabove. The fatty acids which may be used in the practice of the instant invention includes dodecanoic (lauric), tridecanoic, tetradecanoic (myristic), pentadecanoic, hexadecanoic (palmitic), heptadecanoic, octadecanoic (stearic), nonadecanoic, and $C_{20}$ alkanoic (arachidic) acids. Preferred for use in the practice of the instant invention is stearic which is available commercially as a technical grade. The fatty acid is present in the emulsion in proportions which may range from about 0.5% to as much as about 10%; and it will be noted that the fatty acid is used preferably in a low weight ratio to the wax, in the range of about 1:100 to about 1:10.

Another ingredient which is used to particular advantage in the preparation of a readily emulsified wax formulation (particularly suited for incorporation with any polychlorophenol formulation) is a $C_2$–$C_3$ alkylol amine, which may be monoethanol, diethanol, triethanol, monopropanol, dipropanol, etc. amine, but for use with the fatty acid particularly it has been found that the triethanolamine gives the best results (and for improved oil solubility $C_1$–$C_4$ alkyl amines may be used here). As will be seen hereinafter, the amount of alkylol amine employed in the overall emulsion includes a certain amount of such alkylol amine for reaction or combination with the polychlorophenol component, but considering at the moment only the formation of a readily emulsifiable wax melt, which includes the wax and the fatty acid, the amount of alkylol amine that is used for this purpose may range from a practical minimum of about 1 mol of alkylol amine for each mol of fatty acid to a practical maximum of about 5 mols of alkylol amine for each mol of fatty acid, above which the alkylol amine has only a general function as a solubilizing agent. In fact, the amount of alkylol amine used vis-a-vis the fatty acid is preferably only a slight excess over the molar equivalent, i.e., 1.1 to about 2 mols of alkylol amine for each mol of fatty acid.

In preparing the initial wax component for the instant emulsion, the wax and fatty acid are melted together at a moderately elevated temperature above the melting point of the wax (and preferably 20° F. or more thereabove) which temperature may range from about 150° to about 200° F., and the preferred temperature for formation of the melt is about 180° F. After the wax and fatty acid have been melted together, the alkylol amine is added preferably in an aqueous solution. This may be done, and preferably is done at substantially the same elevated temperature at which the melt has been heated (e.g. about 180° F.), by adding the alkylol amine per se before or after the polychlorophenol has been added, or by adding the alkylol amine in an aqueous solution, or by adding the alkylol amine in an aqueous-emulsifier system, again with or without the polychlorophenol, or as an alkylol ammonium polychlorophenate. Each of these procedures has certain advantages with respect to certain combinations of materials and will be described in detail hereinafter.

Another essential material used in the practice of the instant invention is the (monocyclic) polychlorophenol. The polychlorophenol so employed is capable of fungicidal or fungistatic action, a wood preservative function, and a toxic function. It is preferably a $Cl_3$–$Cl_5$ polychlorophenol, which definition includes the trichlorophenols (symmetrical 2,4,6-trichlorophenol and/or unsymmetrical 2,4,5-trichlorophenol), the tetrachlorophenols (2,4,5,6-tetrachlorophenol and/or 2,3,4,6-tetrachlorophenol) and pentachlorophenol. Although the trichlorophenols, and particularly unsymmetrical trichlorophenol, have been found to have unusual water-soluble properties and may be preferred for certain specific uses in which their additional cost will still permit the formation of a competitive composition; the polychlorophenol ordinarily preferred for use in the practice of the instant invention, and the one which is used to particular advantage herein because of its recognized difficulties in handling and solubilizing which are overcome herein, is pentachlorophenol. Pentachlorophenol may, of course, be used in substantially pure form, but this is more expensive, and it is preferable from an economic point of view to use the commercially available technical grade (which contains a nominal amount of impurities including tetrachlorophenols and trichlorophenols, as well as certain complex polymers). The instant invention is unique in that it provides a particularly satisfactory formulation for solubilizing and handling pentachlorophenol.

The amount of polychlorophenol that is employed in the practice of the instant invention may range from a minimum effective amount of about 0.1% to a maximum practical amount of about 10% of the overall emulsion. The preferred proportion in the case of pentachlorophenol is about 0.2% to about 2%, and in the case of trichlorophenol is about 2% to about 5%.

As previously mentioned, an essential ingredient in the instant emulsion is the $C_2$–$C_3$ alkylol amine. This amine is used in amounts already specified with respect to the proportion of fatty acid and, in addition to these amounts, it is also used in an amount ranging from 1 mol of the amine for each mol of the polychlorophenol to as much as about 5 mols of such amine for each mol of polychlorophenol, above which the alkylol amine functions only generally as a solubilizing agent, rather in conjunction with the specific polychlorophenol present. In fact, it is understood that there is a formation of a compound or complex between the alkylol amine and the polychlorophenol, which is hereinafter referred to as an alkylol ammonium polychlorophenate. The alkylol amine that is used for combination with the polychlorophenol may be the same or different from the alkylol amine that is used for combination with the fatty acid. For example, triethanolamine is ordinarily preferred for use in combination with the fatty acid and monoethanolamine is generally preferred for use in combination with the polychlorophenol, although either the monoethanolamine or the triethanolamine could be used for combination with both ingredients. The total amount of alkylol amine thus employed in the practice of the instant invention is thus a practical minimum of a molar proportion which is equal to the total of the molar proportions of the fatty acid and the polychlorophenol components used, but which may be as much as three times this sum of molar proportions (although it is preferably about 1.1 to about 2 times this sum of molar proportions). Expressed in other terms, the amount of alkylol amine used in the instant emulsion may range from a practical minimum of about 0.5% to a practical maximum of about 10%, and this range is preferably about 1% to about 5%.

Still another material that is used in the instant emulsion is, of course, the water which may constitute substantially all of the remaining material in the emulsion, based on the description of this formulation already set forth herein. In any event, the amount of water used is an amount that is sufficient to maintain the stable emulsion, and an amount that is sufficient to permit formation of the stable emulsion using conventional high pressure homogenizing techniques for wax emulsion formulations. In any event, the amount of water ordinarily employed in the instant emulsion may range from about 20% to about 70%.

Another material which is used to particular advantage in the practice of the instant invention is a polyglycol component which is functional as a low order nonionic emulsifier, but functions in the practice of the instant invention primarily as a solvent "coupling agent" to assist in effecting homogeneity in the aqueous phase containing the polychlorophenol component. In this respect it will be appreciated that the homogeneity in the aqueous phase per se (prior to combination with the wax phase) is in the form of a clear system which appears to be a solution to the observer, although it may be an extremely fine dispersion. In contrast, the homogenizing of the materials in the formation of the ultimate wax-in-water emulsion is a conventional homogenizing operation for emulsions or similar compositions and it results in an emulsion that comprises separate phases which thus prevent the emulsion from having the appearance of a clear liquid to the observer, although the homogenized emulsion has a substantially uniform composition.

The polyglycol component is a water-miscible nonionic selected from the class consisting of poly-($C_2$–$C_3$)-alkylene glycol and $C_1$–$C_4$ alkyl ethers thereof. Such materials include di-, tri-, tetra-, etc. up to deca-ethylene or propylene glycol, and the methyl, ethyl, propyl, isopropyl, butyl, isobutyl, etc. monoethers thereof. Preferred for use in the practice of the instant invention is tri-propylene glycol, although other readily available compounds such as monobutyl ether of diethylene glycol, monomethyl ether of diethylene glycol, monomethyl ether of tripropylene glycol, etc. are also functional in the practice of the instant invention. The amount of the polyglycol component that is used in the practice of the instant invention may range from a minimum effective amount of about 0.5% to a maximum effective amount of about 15% of the total emulsion. It is found that the polyglycol component assists materially in solubilizing the polychlorophenol or polychlorophenate component. In using the preferred tri-propylene glycol, the amount employed to obtain the more advantageous results ranges from a minimum practical amount of about 1% to a maximum practical amount of about 15%.

*Example 1*

A charge of 554 parts of wax S, 26 parts of technical stearic acid, and 26 parts of 2,4,5-trichlorophenol is melted together at 180° F. to obtain a uniform melt. A solution of 20 parts of triethanolamine in 374 parts of water is heated to about 180° F. and the melt is added thereto slowly with stirring to effect emulsion formation. This emulsion is then homogenized at 3000 pounds per square inch in conventional homogenizing equipment to obtain a preservative wax emulsion having unusually good stability, and which may be applied as such to dry wood to form a toxic water-repellant coating, but which preferably is diluted 1:10 in water to obtain a formulation that may be readily applied to dry wood by spraying, dipping, brushing, etc.

It will be appreciated that the emulsion concentrate may be diluted as much as 1:25 in water or in an aqueous paint system, and then applied in conventional manner to dry wood to obtain the desired results of the instant invention.

The foregoing procedure results in the preparation of one of the particularly satisfactory concentrates of the instant invention, which is a substantially stable toxic wax-in-water emulsion formed of ingredients consisting essentially of 50% to 70% microcrystalline wax, 1% to 5% stearic acid, 2% to 5% unsymmetrical trichlorophenol, 1% to 5% triethanolamine, and 30% to 40% water.

Moreover, the procedure shown in Example 1 is a preferred procedure for the preparation of the emulsion concentrates of the instant invention, which procedure is found to produce particularly stable and effective emulsions. In summary, this procedure comprises preparing a substantially stable toxic water-in-oil emulsion by melting together 25% to 75% wax, 0.5% to 10% $C_{10}$–$C_{20}$ fatty acid and 0.1% to 10% polychlorophenol; then homogenizing the melt in 0.5% to 10% $C_2$–$C_3$ alkylol amine dissolved in 20% to 70% of water, with the percentage values just given being on the basis of the weight of the final emulsion.

It will be appreciated that in the foregoing, the stearic acid may be replaced by such other fatty acids as palmitic, myristic, lauric and/or arachidic acids. Also, part of the triethanolamine may be replaced by monoethanolamine and/or monoisopropanolamine; and such mixtures are usually more effective.

*Example 2*

A melt is prepared by heating together at about 180° F. 555 parts of wax S, 26 parts of technical stearic acid, 15 parts of tetrachlorophenol, and 13 parts of trichlorophenol. This hot melt is added slowly with stirring to a solution at substantially the same temperature of 20 parts of triethanolamine in 374 parts of water, and then the emulsion is homogenized at 3000 pounds per square inch to obtain unusually stable preservative wax emulsion, which is capable of uses in dilution described in connection with Example 1.

In the instant formulation the more highly soluble trichlorophenol (or triethanol ammonium trichlorophenate) assists in incorporating in the composition a substantial total amount of polychlorophenol, and it also assists in the use of the tetrachlorophenol (or triethanol ammonium tetrachlorophenate). The emulsion obtained in Example 1, however, has superior stability and superior ability to retain the polychlorophenate components during ordinary storage and use of the emulsion concentrate. Expressed in general terms, the procedure thus involved in the practice of the instant invention comprises melting together 50 to 60 parts of microcrystalline wax, 1 to 5 parts stearic acid, 0.5 to 2 parts trichlorophenol and 0.5 to 2 parts tetrachlorophenol; then admixing this melt, at 150° to 200° F., with 1 to 5 parts of triethanolamine dissolved in 30 to 45 parts of water; and homogenizing the mixture to stabilize the emulsion.

In the foregoing procedure, if only trichlorophenol is used as the polychlorophenol component, then it is preferably added in a quantity within the range of about 1 to 5 parts, as is demonstrated in Example 1.

*Example 3*

Another procedure which has been found to be particularly satisfactory in the preparation of emulsions of the instant invention comprises dissolving 0.1 to 10 parts of polychlorophenol in 1 to 20 times as much liquid synthetic nonionic emulsifier at an elevated temperature; admixing therewith at such elevated temperature 1 to 10 mols of $C_2$–$C_3$ alkylolamine for each mol of polychlorophenol, in 30 to 100 parts of water; and then homogenizing into the mixture an amount of wax equal to one-half to three times the water present, said wax having first been melted with 2% to 10% of its weight of $C_{12}$–$C_{20}$ fatty acid.

As a specific example, 52 parts of technical pentachlorophenol is dissolved with heating to about 180° F. in 286 parts of tripropylene glycol. To this solution is then added 12 parts of monoethanolamine, followed by an aqueous solution of 200 parts of triethanolamine in 5110 parts of water, also at 180° F. A melt is then prepared by heating together 4080 parts of wax S and 260 parts of stearic acid, also at 180° F.; and this melt is slowly added with stirring to the previously described tripropylene glycol-aqueous system to obtain an unemulsified mixture that is first stirred and then homogenized at 3000 pounds per square inch to form a stable emulsion. This emulsion is used in the manner described for the emulsion of Example 1 to obtain excellent results.

*Example 4*

A charge of 110 parts of technical pentachlorophenol is dissolved in 715 parts of tripropylene glycol with stirring and heat to about 180° F. To this is then added 31 parts of monoethanolamine with stirring. Next, a solution of 200 parts of triethanolamine in 4604 parts of water, also at 180° F., is added with stirring to form an aqueous-tripropylene glycol system. A wax melt prepared by heating together 4080 parts of wax S and 260 parts of stearic acid, at 180° F., is then added slowly with stirring to the aqueous-tripropylene glycol system; and the resulting mixture is homogenized at 3000 pounds per square inch to form a stable emulsion, which is also useful in the manner described for the emulsion of Example 1.

*Example 5*

A procedure is carried out that is the same as that described in previous Example 4, except that wax S is replaced by wax K, and it is found that particularly satisfactory results are, likewise, obtained for the uses already described for the emulsion. Also, comparable results are obtained by substituting for all or part of the stearic acid such acids as palmitic, myristic, and lauric acids. If part or all of the pentachlorophenol used in the instant example is replaced by trichlorophenol, it is possible to incorporate twice as much polychlorophenol component into the formulation.

In the preferred embodiment of the foregoing procedure, 0.1 to 3 parts of pentachlorophenol is initially dissolved in 1 to 15 parts of tripropylene glycol at 150° to 200° F., and this is followed by admixing therewith an amount of ethanolamine at least sufficient to obtain a pH above 9 in the final aqueous system (and within the range of about 1 to 10 parts of such ethanolamine) plus 30 to 100 parts of water. Then the wax-stearic acid in an amount ranging from one-half to three times the amount of water present is homogenized into the aqueous system.

*Example 6*

A charge of 25 parts of pentachlorophenol is dissolved in 69.2 parts of nonyl thiophenol ethoxylated with 6 mols of ethylene oxide, by heating to about 180° F. To this is added 5.8 parts of monoethanolamine, with stirring while maintaining the temperature of 180° F. Next, 2000 parts of wax S and 100 parts of stearic acid are heated to form a melt, which is then slowly stirred into an aqueous solution of 100 parts of triethanolamine in 2500 parts of water, at 180° F., to form a mixture which is initially homogenized at 3000 pounds per square inch. Then, the previously mentioned product of pentachlorophenol, monoethanolamine and ethoxylated nonyl thiophenol is added slowly with stirring to the initial homogenized product, and the resulting mixture is stabilized by further homogenizing at 3000 pounds per square inch.

*Example 7*

A procedure is carried out that is the same as that of Example 6, except that the initial pentachlorophenol, monoethanolamine and ethoxylated nonyl thiophenol formulation is modified by replacing 39.2 parts of the ethoxylated nonyl thiophenol with tripropylene glycol; and it is found that stable emulsions are obtained in each case.

In each of these Examples 6 and 7, the ethoxylated nonyl thiophenol may be replaced by nonylphenol ethoxylated with 9 to 10 mols of ethylene oxide, so as to obtain comparable results.

*Example 8*

The procedure of the foregoing Examples 6 and 7 is employed except that the pentachlorophenol-monoethanolamine-ethoxylated nonyl thiophenol formulation is replaced by an ammonium pentachlorophenate system (A) prepared as follows: 25 parts of pentachlorophenol are dissolved with heating in 65 parts of nonyl thiophenol ethoxylated with 6 mols of ethylene oxide, at about 180° F. Then 10 parts of 30% aqueous ammonium hydroxide are added with stirring, while this temperature is maintained, so as to obtain a clear solution of ammonium pentachlorophenate in an aqueous-emulsifier system.

If the system (A) just described is replaced by a system (B) formed by heating together 25 parts of pentachlorophenol and 35 parts of tripropylene glycol, at 180° F., then adding 30 parts of an 85% aqueous solution of nonylphenol ethoxylated with 6 mols of ethylene oxide, and then adding 10 parts of 30% aqueous ammonium hydroxide, the result is also good.

It is found that the aforementioned systems (A) and (B) may be employed in the manner described in Example 6 for formation of a wax-in-water emulsion of suitable stability.

*Example 9*

Still another procedure for obtaining wax-in-water emulsions for use in the practice of the instant invention comprises first melting together 25% to 75% of wax and 0.5% to 10% of $C_{12}$–$C_{20}$ fatty acid; then adding this melt at an elevated temperature of about 180° F. sufficient to keep the melt in liquid form to 0.5% to 10% $C_2$–$C_3$ alkylolamine dissolved in 10% to 60% water to form an emulsion (which is preferably formed by homogenizing at 3000 pounds per square inch); and then adding thereto a solution of 0.1% to 10% polychlorophenol (e.g. pentachlorophenol), 1% to 10% mineral oil solvent for the polychlorophenol, 0.05% to 1% of an anionic emulsifier and 0.5% to 5% pine oil; and homogenizing the emulsion at 3000 pounds per square inch.

For example, 554 parts of wax and 26 parts of stearic acid are heated together to 180° F. to form a melt, and this is added slowly with agitation to a solution of 20 parts of triethanolamine in 400 parts of water, also at 180° F. The emulsion formed is stabilized by homogenizing at 3000 pounds per square inch.

A separate pentachlorophenol concentrate is prepared in the form of a solution of 30 parts of pentachlorophenol, 6 parts of calcium dodecylbenzene sulfonate, 20 parts of pine oil and 44 parts of heavy aromatic naphtha, by first heating together at about 140° F. the naphtha, pine oil and pentachlorophenol, and then adding the calcium dodecylbenzene sulfonate. A charge of 10 parts of this pentachlorophenol concentrate is then added with stirring to the emulsion described in the previous paragraph, followed by further stabilization of such emulsion by homogenizing at 3000 pounds per square inch.

The resulting product has excellent wood preservative and water-repellancy properties when applied to dry wood, as such or diluted 1:5–1:10 in water.

In the above formulation the wax S may be replaced by wax K or by commercially available low melting point paraffinic wax designated "crude scale wax" (under the trademark ESSO), with comparable results.

The heavy aromatic naphtha used in the aforementioned formulation may be replaced by any mineral oil solvent for pentachlorophenol, such as those described in Behr Patent No. 2,904,467 (including, of course, the creosotes mentioned therein).

The anionic emulsifier used in the foregoing formulation may be replaced in whole or in part with magnesium dodecylbenzene sulfonate or other alkaline earth metal dodecylbenzene sulfonates, or alkali metal dodecylbenzene sulfonates, or other well known anionic emulsifiers such as the $C_{10}$–$C_{20}$ fatty alcohols sulfated and neutralized, the sulfonated $C_8$–$C_{16}$ alkyl benzenes, neutralized with alkali metals, alkaline earth metals, ammonia and/or alkylol amines.

*Example 10*

Paint concentrates for use in the painting of dry lumber may be prepared from each of the foregoing concentrate wax-in-water emulsions described in the previous examples. For example, a blue paint is obtained by mixing 97 parts of the emulsion of Example 8 with 2 parts of phthalo blue and 1 part of titanium white. A green paint may be obtained by mixing 98 parts of the emulsion of Example 1 with 1 part of phthalo green and 1 part of hansa yellow.

Using 97 parts of the emulsion described in Example 2, combined with 1 part of Lithol red barium, 1 part of toluidine red medium, and 1 part of red oxide, one obtains a red paint.

*Example 11*

(I) A charge of 554 parts of wax S and 26 parts of technical stearic acid is melted together at 180° F. to obtain a uniform melt. A solution of 20 parts of triethanolamine in 400 parts of water is heated to about 180° F. and the wax-stearic acid melt is added thereto slowly with stirring to effect an instant emulsion which is then homogenized at 3000 p.s.i. to form a wax concentrate.

(II) A charge of 81.3 parts of technical pentachlorophenol is dissolved in 300 parts of tripropylene glycol, with heating to 150–160° F. To this is then added 22.4 parts of monoethanolamine without additional heating and with stirring until homogeneous. This is followed by the addition of 596.3 parts of water to obtain a diluted toxicant.

(III) Then the diluted toxicant of paragraph (II), in an amount equal to 26 parts, is added slowly with stirring into 71 parts of the wax concentrate emulsion of paragraph (I), and the system forms a stable emulsion, which is also useful in the manner described for the emulsion of Example 1. If desired, paint concentrates of the types described in Example 10 may be obtained herein by adding to the instant emulsion the blue, green or red color components in the amounts specified in Example 10; otherwise, 3 parts of water may be added to make up a total of 100 parts of the final emulsion.

*Example 12*

(IV) A charge of 76.4 parts of 2,4,5-trichlorophenol is dissolved in 300 parts of tripropylene glycol, with heating to 150–160° F. To this is then added 28.3 parts of monoethanol amine, with stirring without additional heating until homogeneous. Next, there is added 595.3 parts of water to obtain a diluted toxicant.

(V) The diluted toxicant of paragraph (IV) is added slowly with stirring into the wax concentate emulsion of paragraph (I) of Example 11, in the preparation described therein, to obtain results comparable to those described in Example 11.

*Example 13*

The procedure of the previous Example 11 is repeated, except that the diluted toxicant is prepared as follows:

(VI) A charge of 81.3 parts of technical pentachlorophenol is dissolved in 100 parts of tripropylene glycol and 100 parts of 85% aqueous nonyl thiophenol ethoxylated with about 6 mols of ethylene oxide, with heating to 140–160° F. To this is added 22.4 parts of monoethanolamine, with additional stirring but without additional heating, until homogeneous. Next, there is added 696.3 parts of water to obtain the diluted toxicant, which is added while still at about 100° F. to the wax concentrate (I) in the manner described in Example 11. The addition of the ethoxylated nonyl thiophenol (nonionic) greatly facilitates the final emulsion formation, by avoiding any tendency toward wax granulation, and by imparting a hard water tolerance of better than 1000 p.p.m. (Ca, Mg) hardness.

It will also be appreciated that silicones may be used in the practice of the invention to impart additional water repellancy and other desirable properties. Such silicone oils or waxes are commercially available and are used in the previous Examples 11, 12 and 13 by replacing 0.5% of the wax used therein. In general, the amount of silicone oils or waxes used is quite small because of practical considerations, ranging from about 0.01 to 3% of the total wax content. These oils or waxes are conventional siloxanes having the essential physical characteristics of oils or waxes and the general chemical formula of the siloxane polymer

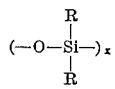

with the Si—O—Si linkages, wherein each R is a low molecular weight organic (preferably, hydrocarbon) radical such as a $C_1$—$C_6$ alkyl (e.g. methyl, ethyl, propyl . . . hexyl), phenyl, cyclohexyl, etc. group. Specifically, the 0.5% siloxane used in Examples 11, 12 and 13 is a phenyl methyl siloxane having a low melting point wax consistency.

It has been found advantageous to use certain nonionic surfactants in conjunction with the polyglycol components in comparable amounts (i.e. from 0.5% to 15% of the total emulsion). Such surfactants are preferably compounds having a long aliphatic radical (e.g. $C_6$–$C_{20}$ alkyl) and a polyalkoxy chain for hydrophobic-hydrophilic balance. Typical compounds include $C_2$–$C_3$ alkylolamides of $C_9$–$C_{20}$ fatty acids and $C_6$–$C_{18}$ alkyl phenols alkoxylated with 3 to 20 mols of $C_2$–$C_3$ alkylene oxide, such compounds including lauric monoethanolamide ethoxylated with 6 mols of ethylene oxide, myristic monoisopropanolamide ethoxylated with 10 mols of ethylene oxide, 5 mol ethoxylated lauric diethanolamide, 6 mol ethoxylated nonyl phenol or nonyl thiophenol, 9–10 mol ethoxylated nonyl phenol or nonyl thiophenol, 6 mol ethoxylated lauryl alcohol, etc.; and the compounds preferred for use in the invention (as shown particularly in Example 13) are 6–10 mol ethoxylated nonyl chalcophenols (i.e. phenols and thiophenols) in amounts ranging from 1% to 5% of the final emulsion product.

The foregoing nonionic surfactants are particularly useful in imparting prolonged stability to the final emulsion product; whereas other emulsion products of the invention may have more limited storage stability, may require pumping, mixing or circulation during use, or may preferably be formulated by the end user from diluted toxicant components such as those of previous paragraphs (II), (IV) and (VI) and from conc 10 parts of polychlorophenol in 1 to 20 times as much liquid synthetic water-miscible nonionic selected from the class consisting of poly-$(C_2-C_3)$-alkylene glycol and $C_1-C_4$ alkyl ethers thereof at an elevated temperature; admixing therewith at such elevated temperature 1 to 10 mols per mol of polychlorophenol of $C_2-C_3$ alkylol amine in 10 to 30 parts of water; and then stirring into an emulsion composed of an amount of wax equal to one-half to three times the water present, said wax having been melted with 2% to 10% of its weight of $C_{12}-C_{20}$ fatty acid and an equal weight of alkylol amine and homogenized at 3000 p.s.i.

11. A method of preparing a substantially stable toxic wax-in-water emulsion, that comprises dissolving 0.1 to 3 parts pentachlorophenol in 1 to 15 parts tripropylene glycol at 150° to 200° F.; admixing therewith an amount of ethanolamine at least sufficient to obtain a pH above 9 and within the range of 1 to 10 parts, plus 30 to 100 parts of water; and then stirring into a preformed emulsion composed of an amount of wax equal to one-half to three times the water present, said wax having been melted with 2% to 10% of its weight of $C_{12}-C_{20}$ fatty acid and an equal weight of triethanolamine before homogenizing at 3000 p.s.i.

12. A substantially stable toxic wax-in-water emulsion formed of ingredients consisting essentially of 25% to 75% wax, 0.5% to 10% $C_{12}-C_{20}$ fatty acid, 0.1% to 10% polychlorophenol, 0.5% to 10% $C_2-C_3$ alkylol amine, 1% to 10% mineral oil solvent for the polychlorophenol, 0.05% to 1% anionic emulsifier, 0.5% to 5% pine oil, and the remainder substantially water, in an amount sufficient to maintain the stable emulsion.

13. A method of preparing a substantially stable toxic wax-in-water emulsion, which comprises melting together 25% to 75% wax and 0.5% to 10% $C_{12}-C_{20}$ fatty acid; adding the melt at an elevated temperature, sufficient to keep the melt in liquid form, to 0.5% to 10% $C_2-C_3$ alkylol amine dissolved in 10% to 60% water; and homogenizing before adding by stirring thereto 0.1% to 10% polychlorophenol, 1% to 10% mineral oil solvent for the polychlorophenol, 0.05% to 1% anionic emulsifier and 0.5% to 5% pine oil; the percentage values being on the basis of the weight of the final emulsion.

14. A method of preparing a substantially stable toxic wax-in-water emulsion, that comprises dissolving 0.1 to 10 parts of polychlorophenol in 1 to 20 times as much liquid synthetic nonionic consisting essentially of (a) water-miscible nonionic selected from the class consisting of poly-$(C_2-C_3)$-alkylene glycol and $C_1-C_4$ alkyl ethers thereof and (b) nonionic surfactant material having a $C_6-C_{20}$ aliphatic radical and a 3 to 20 mol polyalkoxylated chain, the weight ratio of (a) to (b) ranging from 10:1 to 1:2; admixing therewith at an elevated temperature 1 to 5 mols per mol of polychlorophenol of $C_2-C_3$ alkylol amine in 30 to 100 parts of water; and then stirring into 2–5 times its weight of a previously homogenized wax emulsion formed by homogenizing at 3000 p.s.i. a molten mass of 30 to 100 parts of wax and 2 to 10% of its weight of $C_{12}-C_{20}$ fatty acid into a 1 to 2 mols of $C_2-C_3$ alkylol amine in 30 to 100 parts of water.

References Cited by the Examiner

UNITED STATES PATENTS

| | | | |
|---|---|---|---|
| 2,288,351 | 6/1942 | Griffith | 252—311.5 |
| 2,708,640 | 5/1955 | Davis | 167—38.7 |
| 2,784,139 | 3/1957 | Cutler | 167—38.7 |
| 2,925,361 | 2/1960 | Bollenback | 167—31 |

OTHER REFERENCES

Becher, "Principles of Emulsion Technology," Reinhold Pub. Corp., New York, N.Y., 1955, pp. 109–111.

Bennett, "Practical Emulsions," Chemical Pub. Co., Inc., Brooklyn, New York, 1947, pp. 438 and 447.

"Emulsions," Union Carbide and Carbon Corp. 7th Ed., New York, N.Y., 1946, 72 page booklet (pp. 35–38).

Schwartz et al., "Surface Active Agents," Vol. I, Interscience Pub., Inc., New York, 1949, pp. 202–207.

JULIAN S. LEVITT, *Primary Examiner.*

GEORGE A. MENTIS, *Assistant Examiner.*